W. J. RAY.
JOURNAL BOX.
APPLICATION FILED FEB. 26, 1917.

1,241,658.

Patented Oct. 2, 1917.

WITNESSES
W. C. Fielding.
H. H. Babcock,

INVENTOR
William J. Ray

BY Richard B. Owen.

ATTORNEY

UNITED STATES PATENT OFFICE.

WILLIAM J. RAY, OF FORT SMITH, ARKANSAS.

JOURNAL-BOX.

1,241,658.　　　　Specification of Letters Patent.　　Patented Oct. 2, 1917.

Application filed February 26, 1917. Serial No. 151,116.

*To all whom it may concern:*

Be it known that I, WILLIAM J. RAY, a citizen of the United States, residing at Fort Smith, in the county of Sebastian and the State of Arkansas, have invented certain new and useful Improvements in Journal-Boxes, of which the following is a specification.

This invention relates to lubricating means, and more particularly to a journal box adapted to rotatably support a shaft, the shaft being provided with means for elevating a lubricant contained within the box, and the box being provided with means for discharging this lubricant onto the bearing surface of the shaft.

One of the main objects of the invention is to provide a device of the character stated of simple construction and operation which may be produced at relatively small cost. A still further object is to provide a box or casing for containing the lubricant having means for preventing creeping of the lubricant along the shaft. A still further object is to provide a box and a shaft rotatably mounted therein, the box having a bearing member for rotatably supporting the shaft provided with an opening communicating directly with the shaft receiving opening of this member, a disk being secured on the shaft so as to dip into the lubricant within the casing, the casing being provided with a scraper member engaging the peripheral surface of the disk so as to remove the lubricant from the same when the disk and shaft are rotated, this scraper member being adapted to discharge the lubricant removed from the disk through the opening onto the bearing surface of the shaft. Other objects will appear from the detailed description.

Figure 1:
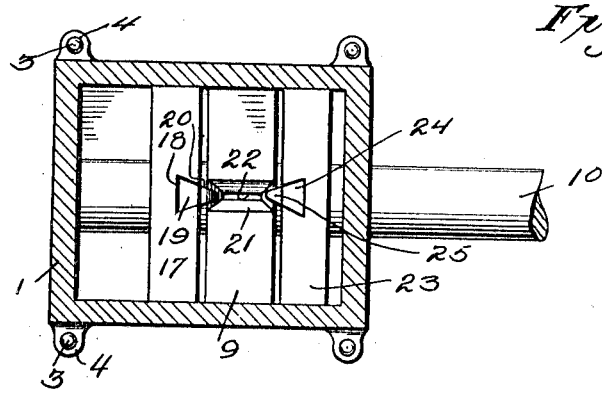
Figure 1 is a horizontal sectional view taken through a lubricating device constructed in accordance with my invention on a plane coincident with the under face of the top of the casing.

The casing is composed of the upper section 1 and the lower section 2, which are releasably secured together by means of screws 3 inserted through lugs 4 and 5 provided on the sections 1 and 2, respectively, for this purpose. The upper section 1 is provided, adjacent one end with a partition member or cross-piece 6 extending the full width of the casing, a similar member 7 being provided remote from the other end of section 1. Members 6 and 7 are adapted to coöperate with cross pieces 6ª and 7ª, respectively, secured in the lower section 2 of the casing. A bearing beam 8 is secured in the lower section 2 of the casing intermediate members 6ª and 7ª. This beam coöperates with a beam 9 secured in the upper section 1, these two members forming a bearing member for rotatably receiving a shaft 10. The beams 8 and 9 are provided with semi-circular recesses which form a circular shaft receiving opening when the casing is assembled, as in Figs. 2 and 3 of the drawings. This bearing member snugly receives the shaft so as to support the same, as shown. The coöperating partition members 6 and 6ª, and 7 and 7ª, are also provided with semi-circular recesses which are of such size as to provide shaft receiving openings 11 and 12 of greater diameter than the shaft 10, the end walls of the sections 1 and 2 of the casing being provided with similar recesses which form the circular shaft receiving openings 13 and 14 which are also of greater diameter than the shaft. By this construction, when the casing is assembled, the shaft is mounted for free rotation in the bearing member composed of the beams 8 and 9, the shaft being supported out of contact with the walls of the casing and the partition members.

Figure 2:
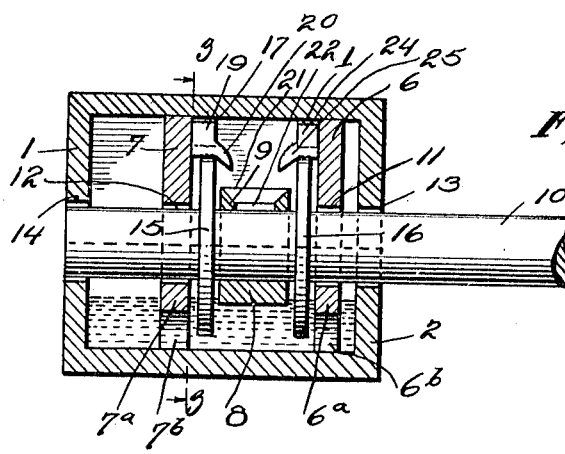
Fig. 2 is a vertical central longitudinal sectional view.
Figure 3:
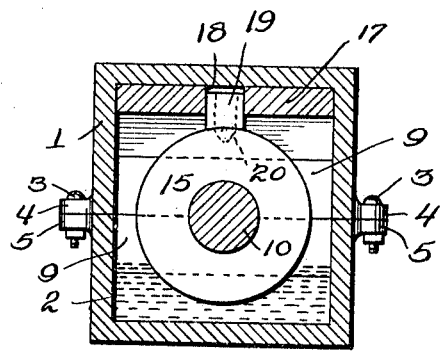
Fig. 3 is a section taken on line 3—3 of Fig. 2.

The casing is adapted to contain the lubricant, which is normally maintained at a level slightly below openings 13 and 14 as shown in Figs. 2 and 3 of the drawings. A disk 15 is secured on shaft 10 intermediate the bearing member and the partition members 7 and 7ª, a similar disk 16 being secured on the shaft at the other side of the bearing member intermediate the same and the partition members 6 and 6ª. These two disks dip into the lubricant so that, when the shaft is rotated, the disks will raise the lubricant so as to permit the same to be discharged onto the bearing surface of the shaft in a manner to be described.

A cross bar 17 is secured in the upper section 1 of the casing, adjacent the top thereof, above disk 15. This cross bar is provided, at its longitudinal center, with a dovetailed groove 18 which loosely receives a scraper member or brush 19. This scraper has its under face curved so as to fit snugly against the peripheral face of disk 15 and is provided, at its lower end, with an inwardly projecting and downwardly directed finger 20. This finger is so disposed as to extend above the approximately inverted frusto-pyramidal recess 21 formed at the center of the upper face of bearing beam 9. This recess communicates with a slot 22 which is in direct communication with the shaft receiving opening of the bearing member composed of beams 8 and 9. The scraper member 19 is freely movable vertically in the cross bar 17, and is normally held snugly in engagement with the peripheral surface of disk 15 by gravity. A cross bar 23 is provided above disk 16, a scraper member 24 similar to member 19 being loosely mounted in this bar for vertical movement and normally held in engagement with the peripheral surface of disk 16 by gravity. This member 24 is also provided with a finger 25 adapted to discharge the lubricant into the recess 22.

When the shaft 10 is rotated, the disks 15 and 16, which dip into the lubricant, act to raise the lubricant. During the rotation of the disk, the members 19 and 24 scrape the lubricant from the peripheral surface of the disk. This lubricant which is thus scraped from the disk, flows downwardly along the fingers 20 and 25 of the scraper members 19 and 24, respectively, and drips into the recess 21 flowing through the slot 22 directly onto the bearing surface of shaft 10. By this means, I insure, that, when the shaft is rotated, the lubricant will be fed directly onto the bearing surface of the same, thus eliminating all danger of excessive heating or burning out of the bearings and avoid the loss of energy due to such heating.

To permit the lubricant to flow freely within the casing, the lower bearing beam 8 is spaced above the bottom of the casing, and partition members 6ª and 7ª are provided, in their under faces, with arcuate openings 6ᵇ and 7ᵇ, respectively. As the shaft is rotated, the lubricant is raised by the disks and discharged onto the bearing surface of the shaft which thus constantly operates in an oil bath, the excess lubricant flowing back into the lower section of the casing. It has been found that, when a shaft is rotated in an oil bath at high speed, the oil is sucked or drawn to the shaft. This results in an excess of lubricant being fed upon the shaft which has a tendency to creep along the shaft thus resulting in great waste of the lubricant. This is especially true where the shaft is rotated in a comparatively large body of lubricant. I have found that by providing the partition members for separating the disks 15 and 16 from the main body of the lubricant, this tendency to suck the oil onto the shaft is to a large extent eliminated thus effecting a material saving in the lubricant.

This device is intended more particularly as an improvement over my journal box disclosed in my United States Patent #1200759, dated October 10, 1916. In this patent I have shown a journal box and a shaft so related as to insure that the bearing member for the shaft shall rotate in an oil bath at all times, the lubricant having free circulation through the casing of the box. While this device is very good in many cases, I have found that I can obtain better results by constructing the device in the manner herein described, feeding the lubricant directly onto the bearing surface of the shaft through the medium of the scraper members shown and described. While the principle of operation between this device and the device disclosed in my patent referred to are very similar, the specific constructions of the two devices are materially different, but they both involve the broad idea of the bearing member mounted for rotation in an oil bath and means for continuously supplying oil to this member.

What I claim is:—

1. In lubricating means, a casing adapted to contain a lubricant, a bearing member carried thereby for rotatably supporting a shaft and provided with an opening through its upper portion communicating with the shaft receiving opening of said member, a shaft mounted in said bearing member, a disk carried by said shaft within the casing, and a vertically movable scraping member mounted in the casing above the disk and normally in engagement therewith, said member being adapted to remove lubricant from the disk when said disk is rotated and having a drip finger projecting above the opening through the bearing member so as to discharge the lubricant removed from the disk into said opening.

2. In lubricating means, a casing adapted to contain a lubricant, a bearing member carried thereby for rotatably receiving a shaft, a shaft mounted in said member, a partition member intermediate said bearing member and one end of the casing, a disk secured on the shaft intermediate said partition member and the bearing member, the bearing member and partition members being provided with openings in their under faces so as to permit free circulation of a lubricant about and through said members, and means carried by the casing and in engagement with the disk for removing lubricant from said disk when the shaft is rotated and for discharging this lubricant onto the bearing surface of said shaft.

In testimony whereof I affix my signature in presence of two witnesses.

WILLIAM J. RAY.

Witnesses:
J. W. RICE,
J. N. REESE.

Copies of this patent may be obtained for five cents each, by addressing the "Commissioner of Patents. Washington, D. C."